US012404122B2

(12) United States Patent
Nitta et al.

(10) Patent No.: US 12,404,122 B2
(45) Date of Patent: Sep. 2, 2025

(54) SHEET FEEDING APPARATUS AND IMAGE FORMING APPARATUS

(71) Applicant: Canon Kabushiki Kaisha, Tokyo (JP)

(72) Inventors: Jumpei Nitta, Kanagawa (JP); Kazuhiro Hosohara, Kanagawa (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 305 days.

(21) Appl. No.: 17/534,530

(22) Filed: Nov. 24, 2021

(65) Prior Publication Data

US 2022/0185605 A1 Jun. 16, 2022

(30) Foreign Application Priority Data

Dec. 11, 2020 (JP) ................................ 2020-205494

(51) Int. Cl.
*B65H 1/04* (2006.01)
*G03G 15/00* (2006.01)

(52) U.S. Cl.
CPC ........... *B65H 1/04* (2013.01); *G03G 15/6529* (2013.01); *B65H 2402/31* (2013.01); *B65H 2402/32* (2013.01)

(58) Field of Classification Search
CPC .................. B65H 1/04; B65H 2402/45; B65H 2402/441; B65H 2405/324; B65H 2405/1124; B65H 2407/21; G03G 15/6514
See application file for complete search history.

(56) References Cited

U.S. PATENT DOCUMENTS 7,748,691 B2 * 7/2010 Mizuguchi ......... G03G 15/6514 271/171
9,604,806 B2 * 3/2017 Okura ...................... B65H 1/04
(Continued)

FOREIGN PATENT DOCUMENTS

JP H10-245141 A 9/1998
JP 2007-153455 A 6/2007
(Continued)

OTHER PUBLICATIONS

Tomoya Tateishi et al., U.S. Appl. No. 17/496,856, filed Oct. 8, 2021, Art Unit 1743.
(Continued)

*Primary Examiner* — Patrick Cicchino
(74) *Attorney, Agent, or Firm* — VENABLE LLP

(57) ABSTRACT

A sheet feeding apparatus includes a first supporting portion movable between a closed position and an open position supporting a sheet, an interlocking portion to move the first supporting portion from the closed position to the open position when a cover is opened, and a second supporting portion. A feed portion feeds a sheet supported by the first and second supporting portions in a sheet feeding direction. A moving angle of the first supporting portion moving from the closed position to the open position is smaller than a moving angle of the cover moving from the closed position to the open position, and the first supporting portion includes an upstream end portion and a downstream end portion. In a state where the cover and first supporting portion are open, the upstream end portion is further from an exterior surface of the cover than the downstream end portion.

20 Claims, 10 Drawing Sheets

(56) References Cited

U.S. PATENT DOCUMENTS

| | | | | |
|---|---|---|---|---|
| 9,665,053 | B2 * | 5/2017 | Mori | G03G 15/6514 |
| 10,053,310 | B2 | 8/2018 | Nishiyama et al. | |
| 11,286,124 | B2 * | 3/2022 | Kannari | B65H 1/04 |
| 11,795,017 | B2 * | 10/2023 | Nishiyama | B65H 1/04 |
| 2009/0267283 | A1 | 10/2009 | Mizuguchi | |
| 2016/0332832 | A1 | 11/2016 | Okura | |

FOREIGN PATENT DOCUMENTS

| | | | |
|---|---|---|---|
| JP | 2009-263078 | A | 11/2009 |
| JP | 2016216155 | A | 12/2016 |

OTHER PUBLICATIONS

Japanese Office Action dated Oct. 1, 2024, in related Japanese Patent Application No. 2020-205494.

* cited by examiner

SHEET FEEDING APPARATUS AND IMAGE FORMING APPARATUS

BACKGROUND OF THE INVENTION

Field of the Invention

The present invention relates to a sheet feeding apparatus configured to feed a sheet and to an image forming apparatus including the same.

Description of the Related Art

Hitherto, a printer including a sheet feeding unit configured to feed a sheet loaded in a manual sheet feed portion has been proposed by Japanese Patent Application Laid-open No. 2016-216155 for example. The manual feed tray includes a cover openably and closably supported by an apparatus body of the printer, a base tray and an auxiliary tray supported on an upper surface of the cover and an interlock mechanism configured to move the base tray in an interlock manner with opening and closing operations of the cover. The auxiliary tray moves from a storage position to a lifting position along with the opening operation of the cover.

According to Japanese Patent Application Laid-open No. 2016-216155, the auxiliary tray is configured to move from the storage position to the lifting position by being brought into pressure contact with a hook portion of the base tray.

SUMMARY OF THE INVENTION

According to an aspect of the present invention, a sheet feeding apparatus includes an apparatus body, a cover openably and closably supported between a first closed position and a first open position with respect to the apparatus body, a first supporting portion movable between a second closed position where the first supporting portion is accommodated in the apparatus body and a second open position where the first supporting portion is capable of supporting a sheet, an interlocking portion configured to move the first supporting portion from the second closed position to the second open position in a case where the cover is opened from the first closed position to the first open position, a second supporting portion drawably supported by the first supporting portion and capable of supporting the sheet together with the first supporting portion, and a feed portion configured to feed the sheet supported by the first and second supporting portions. A moving angle of the first supporting portion in moving from the second closed position to the second open position is smaller than a moving angle of the cover in moving from the first closed position to the first open position.

Further features of the present invention will become apparent from the following description of exemplary embodiments with reference to the attached drawings.

DESCRIPTION OF THE EMBODIMENTS

Overall Configuration

Figure 1:
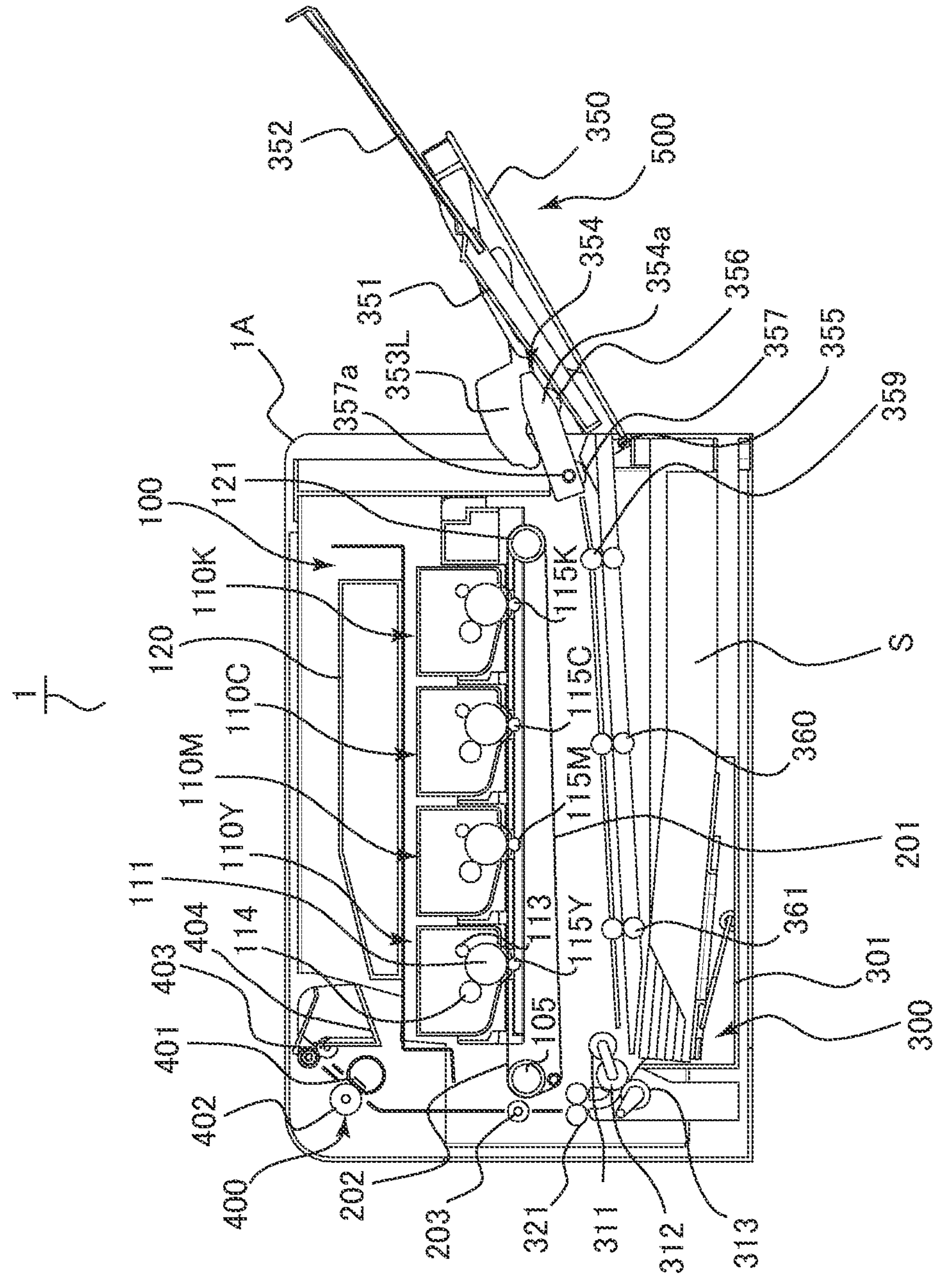
FIG. 1 is a schematic diagram illustrating an overall configuration of a printer according to a present exemplary embodiment.

A printer 1 serving as an image forming apparatus of the present exemplary embodiment is an electro-photographic type full-color laser beam printer. As illustrated in FIG. 1, the printer 1 includes an image forming unit 100 configured to form an image on a sheet S, a cassette sheet feed portion 300, a fixing portion 400 and a manual sheet feed portion 500. The image forming unit 100 includes four process cartridges 110Y, 110M, 110C and 110K respectively configured to form four color toner images of yellow (Y), magenta (M), cyan (C) and black (K) and a scanner unit 120.

Note that the four process cartridges 110Y, 110M, 110C and 110K have the same configuration except the colors of images to be formed are different. Therefore, the configuration and an image forming process of only the process cartridge 110Y will be described below and descriptions of the process cartridges 110M, 110C and 110K will be omitted.

The process cartridge 110Y includes a photosensitive drum 111, a charging roller 113 and a developing roller 114. The photosensitive drum 111 is constructed by applying an organic photoconductive layer on a circumference of an aluminum cylinder and is rotated by a driving motor not illustrated. Note that a photoconductive belt may be used instead of the photosensitive drum 111. The image forming unit 100 includes an intermediate transfer belt 201 wound around a driving roller 105, a tension roller 121 and others. The intermediate transfer belt 201 is rotated by the driving roller 105 clockwise in FIG. 1. Provided inside of the intermediate transfer belt 201 are primary transfer rollers 115Y, 115M, 115C and 115K.

The fixing portion 400 includes a fixing film 401 heated by a heater not illustrated and a pressure roller 402 in pressure contact with the fixing film 401. The cassette sheet feed portion 300 is provided at a lower part of the printer 1 and includes a sheet feed cassette 301 drawable from and attachable to a printer body 1A serving as an apparatus body.

Next, an image forming operation of the printer 1 thus constructed will be described. As an image signal is inputted to the scanner unit 120 from a personal computer or the like not illustrated, the scanner unit 120 irradiates the photosensitive drum 11 of the process cartridge 110Y with a laser beam corresponding to the image signal.

At this time, a surface of the photosensitive drum 111 has been homogeneously charged with a predetermined polarity and potential by the charging roller 113 in advance and an electrostatic latent image is formed on the surface of the photosensitive drum 1111 by the laser beam irradiated from the scanner unit 120. The electrostatic latent image formed on the photosensitive drum 111 is developed by the developing roller 114 to be a toner image of yellow (Y) on the photosensitive drum 111.

In the same manner, the respective photosensitive drums of the process cartridges 111M, 111C and 111K are also irradiated by the scanner unit 120 with the laser beams, and toner images of magenta (M), cyan (C) and black (K) are formed on the photosensitive drums, respectively. The respective toner images formed on the respective photosensitive drums are then transferred by primary transfer rollers 115Y, 115M, 115C and 115K onto the intermediate transfer belt 201 and are conveyed to a secondary transfer roller 203 by the intermediate transfer belt 201 rotated by the driving roller 105.

Note that the image forming processes of the respective colors are performed with a timing of superimposing on an upstream toner image primarily transferred onto the intermediate transfer belt 201. Toner left on the surface of the photosensitive drum 111 after transferring each color toner image onto the intermediate transfer belt 201 is removed by a cleaning unit not illustrated.

In parallel with the image forming process, a sheet S accommodated in the sheet feed cassette 301 of the cassette sheet feed portion 300 or a sheet supplied from a manual sheet feed portion 500 is fed by a pickup roller 311. The sheet S fed by the pickup roller 311 serving as a feed portion is separated one by one at a separation nip formed by a feed roller 312 and a separation roller 313.

A torque limiter not illustrated is attached to the separation roller 313 such that the separation roller 313 does not rotate in a case where two more sheets enter the separation nip and such that the separation roller 313 is rotated by the feed roller 312 in a case where one sheet enters the separation nip. Note that a so-called retard roller system of inputting a rotational drive in a direction opposite to a sheet feeding direction may be adopted instead of the separation roller 313.

The sheet S separated one by one by the separation nip is then conveyed to a registration roller pair 321. The registration roller pair 321 corrects a skew of the sheet S and conveys the sheet S with a predetermined timing synchronized with the image forming process. Then, a full-color toner image on the intermediate transfer belt 201 is transferred onto the sheet S by a secondary transfer bias applied to the secondary transfer roller 203.

The sheet S onto which the toner image has been transferred is then conveyed to the fixing portion 400 to undergo predetermined heat and pressure by the fixing film 401 and the pressure roller 402 of the fixing portion 400 to melt and secure, i.e., to fix, the toner onto the sheet S. The sheet S which has passed through the fixing portion 400 is discharged onto a discharge tray 404 by a discharge roller pair 403.

Manual Feed Portion

Figure 2:
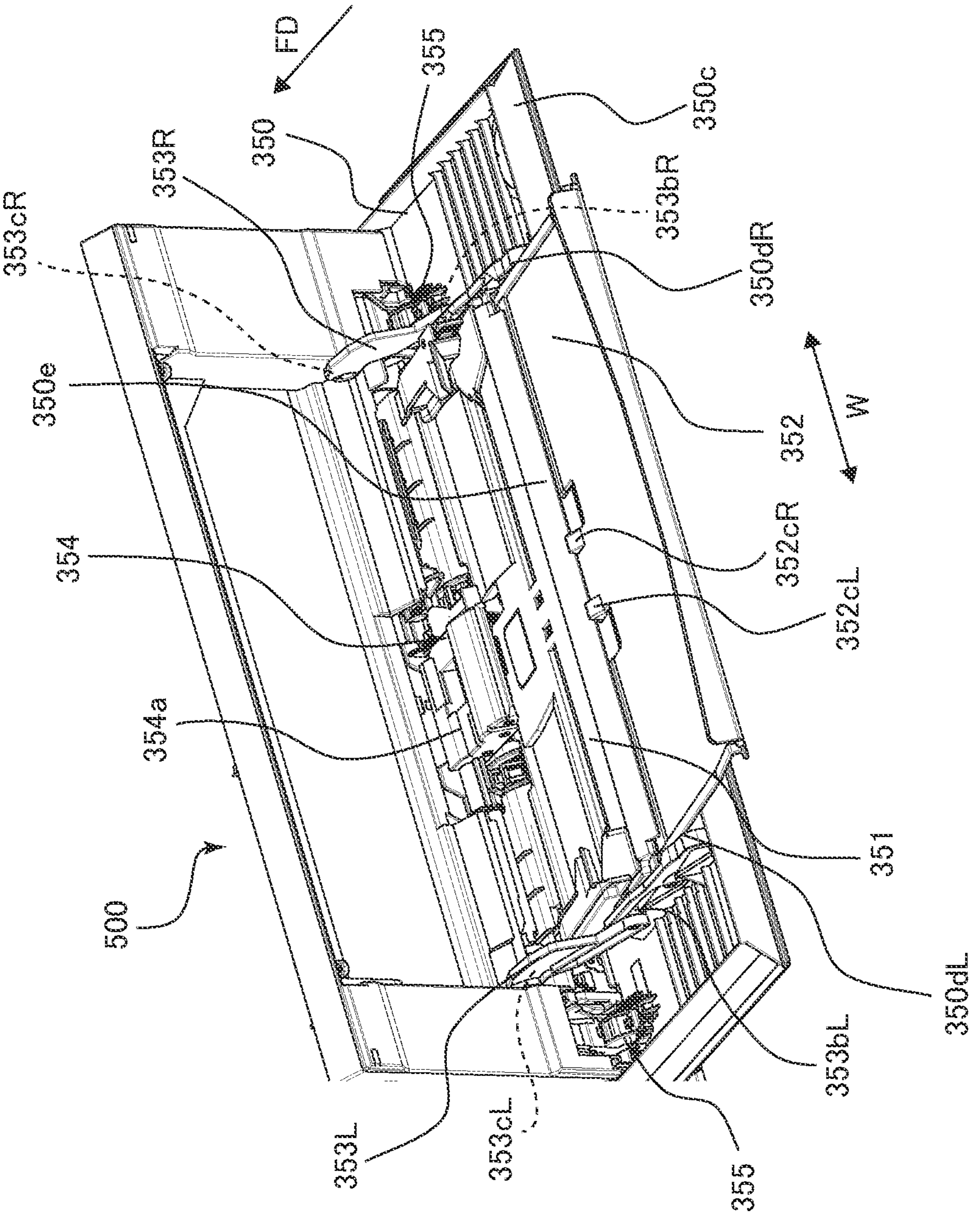
FIG. 2 is a perspective view illustrating a manual sheet feed portion.

Next, a configuration of the manual sheet feed portion 500 serving as a sheet feeding apparatus will be described with reference to FIGS. 1 through 6. As illustrated in FIGS. 1 and 2, the manual sheet feed portion 500 includes a front cover 350, a manual feed tray 351, an extension tray 352, link arms 353L and 353R, a sheet feed unit 354 and others. Parts configured to support at least the link arms 353L and 353R and parts configured to support the front cover 350 of the printer body 1A are also included in the manual sheet feed portion 500 in the present exemplary embodiment.

Figure 7:
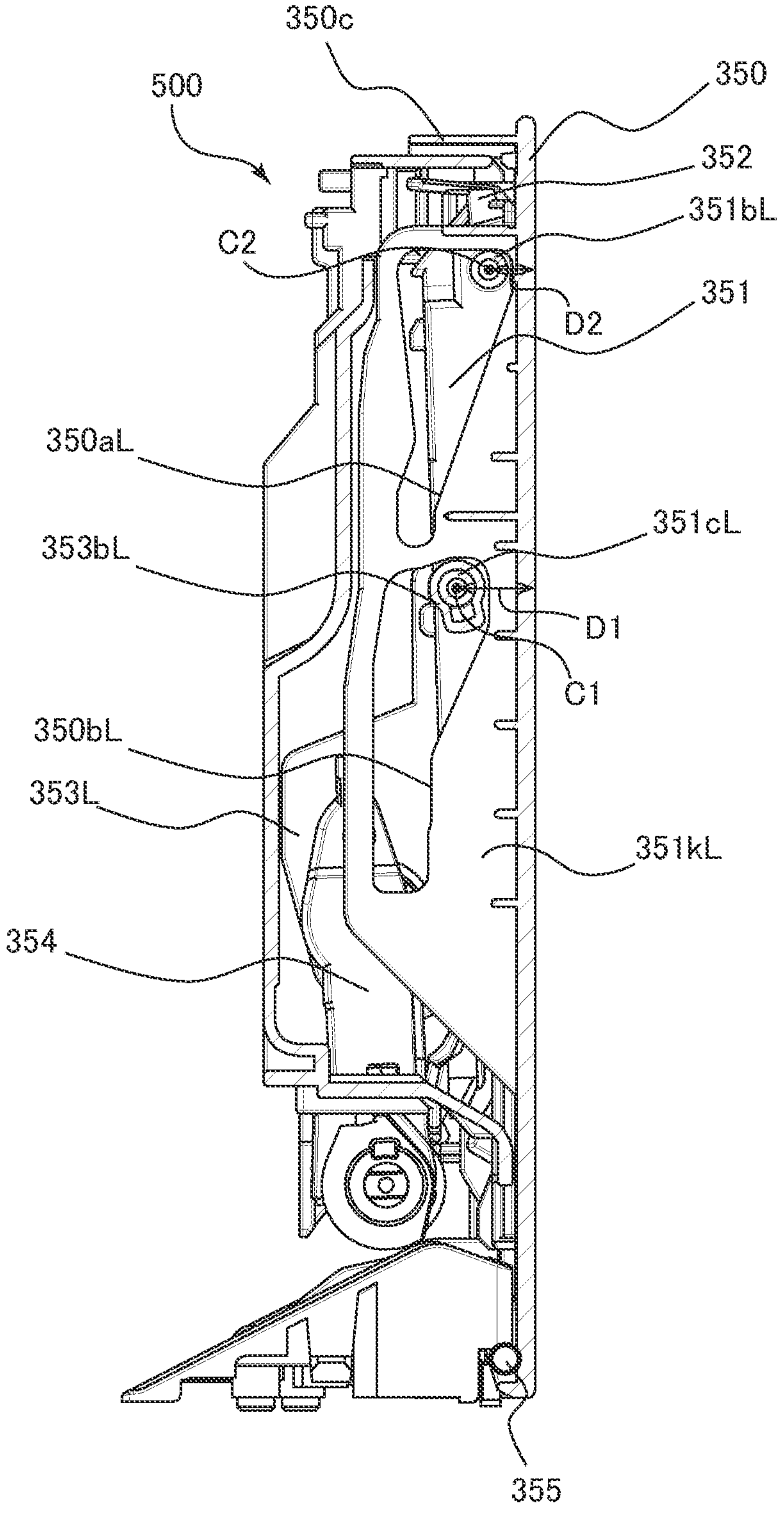
FIG. 7 is a section view illustrating the manual sheet feed portion in a case where the front cover is positioned at a closed position.
Figure 8:
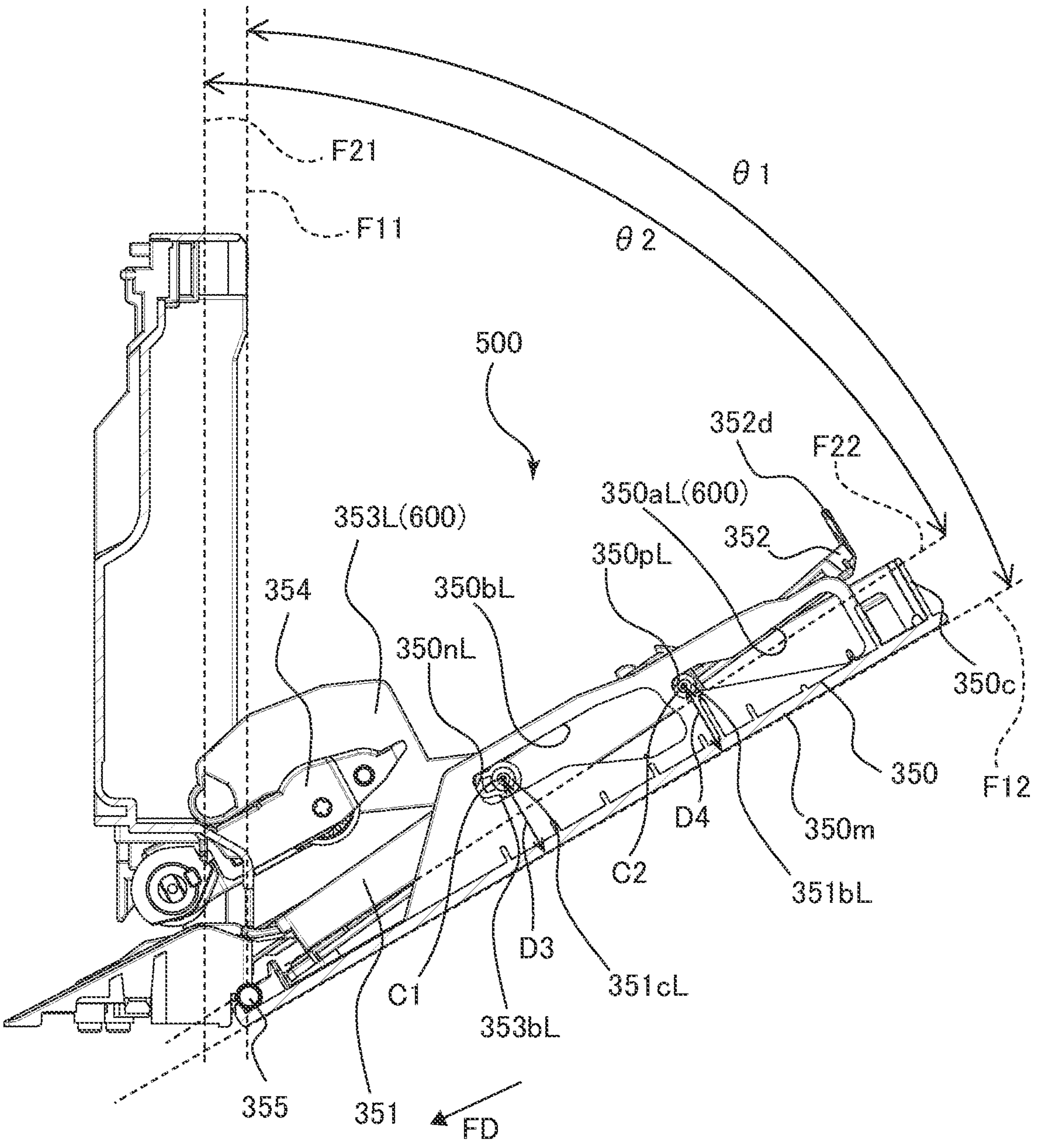
FIG. 8 is a section view illustrating the manual sheet feed portion in a case where the front cover is located at an open position.

The front cover 350 serving as a cover of the manual sheet feed portion 500 is openably and closably supported to the printer body 1A centering on an opening and closing shaft 355 between a closed position, i.e., a first closed position as illustrated in FIG. 7 and an open position, i.e., a first open position as illustrated in FIG. 8. The front cover 350 is positioned at the closed position when no sheet is fed in the manual sheet feed portion 500 and composes a part of an exterior face of the printer 1 at this time. The front cover 350 is positioned at the open position when a sheet is to be fed in the manual sheet feed portion 500.

A user loads a sheet on a manual feed tray 351 attached to the front cover 350 while positioning the front cover 350 at the open position. In a case where a sheet to be fed by the manual sheet feed portion 500 is a long-size sheet for example, an extension tray 352 described later may be drawn out of the manual feed tray 351 to support the long-size sheet by the manual feed tray 351 and the extension tray 352.

The sheet feed unit 354 includes a pickup arm 354*a* pivotably supported by the printer body 1A centering on a feed roller shaft 357*a*. The sheet feed unit 354 also includes a pickup roller 356 rotatably supported by the pickup arm 354*a* and a feed roller 357. As a job of feeding a sheet from the manual sheet feed portion 500 is inputted in a state in which the sheet is stacked in the manual feed tray 351 of the manual sheet feed portion 500, the pickup arm 354*a* pivots such that the pickup roller 356 is lowered.

Then, the sheet is fed as the pickup roller 356 rotates in a state in which the pickup roller 356 is in contact with the sheet on the manual feed tray 351. The sheet fed by the pickup roller 356 is conveyed toward the registration roller pair 321 by the feed roller 357 and conveyance roller pairs 359, 360 and 361.

Figure 3:
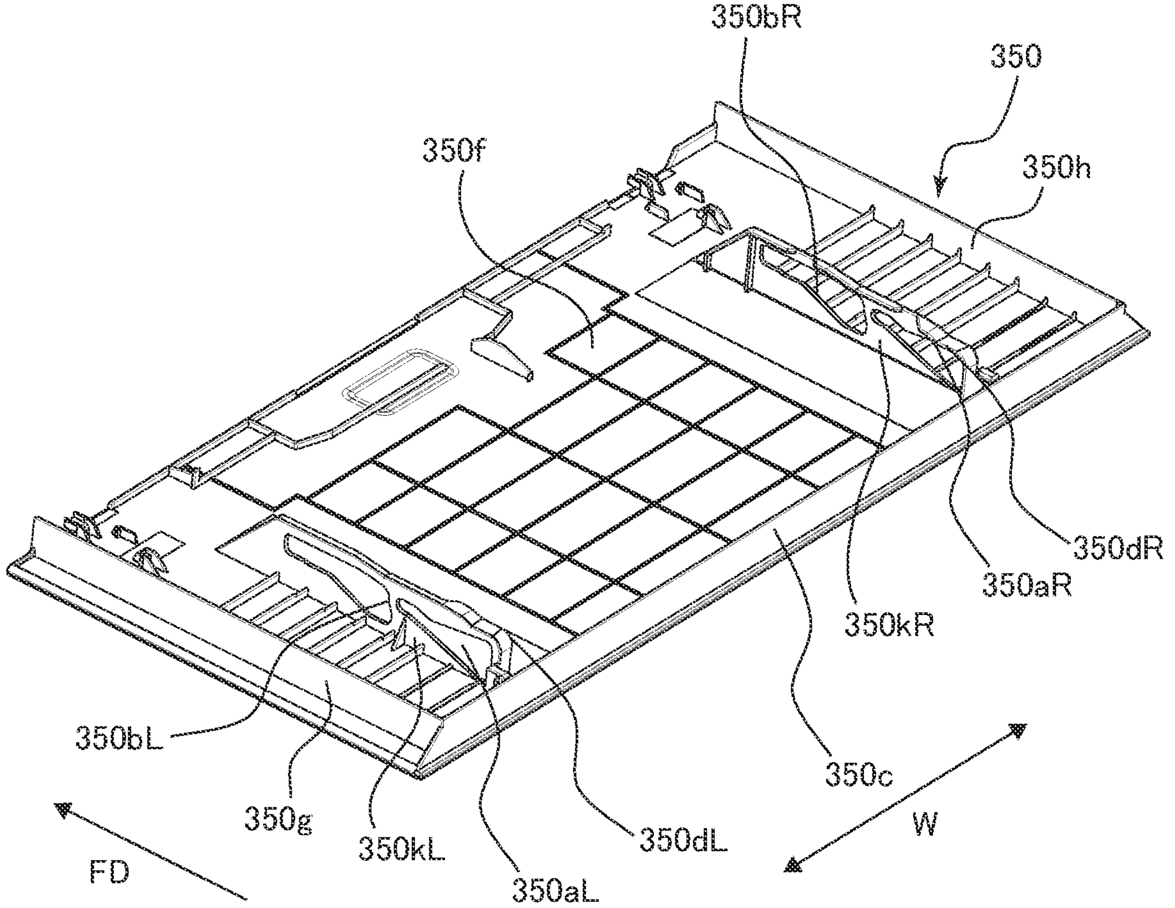
FIG. 3 is a perspective view illustrating a front cover.

As illustrated in FIG. 3, the front cover 350 includes an inner surface 350*f* facing to the printer body 1A at the closed position and ribs 350*c*, 350*g* and 350*h* provided along outer edge of the inner surface 350*f* and extending in a direction of separating from the exterior face 350*m*. These ribs 350*c*, 350*g* and 350*h* are provided so as to rise up from the inner surface 350*f* to improve stiffness of the front cover 350.

Provided also inside of the ribs 350*c*, 350*g* and 350*h* of the front cover 350 is a pair of tray supporting portions 350*k*L and 350*k*R formed so as to rise up from the inner surface 350*f*. A first guide rail 350*a*L, a second guide rail 350*b*L and a restriction rib 350*d*L are formed on the tray supporting portion 350*k*L. A first guide rail 350*a*R, a second guide rail 350*b*R and a restriction rib 350*d*R are formed on the tray supporting portion 350*k*R. The first guide rails 350*a*L and 350*a*R are disposed respectively downstream of the second guide rails 350*b*L and 350*b*R in terms of the sheet feeding direction FD. The restriction ribs 350*d*L and 350*d*R are formed so as to extend inside in the width direction W at upper end portions of the tray supporting portions 350*k*L and 350*k*R.

Next, while the link arms 353L and 353R will be described below, the link arms 353L and 353R are formed to be symmetrical in the width direction W (see FIG. 2) orthogonal to the sheet feeding direction FD. Therefore, the link arm 353L serving as a pivot member will be mainly described below with reference to FIG. 4 and a description of the link arm 353R will be appropriately omitted.

Figure 4A:
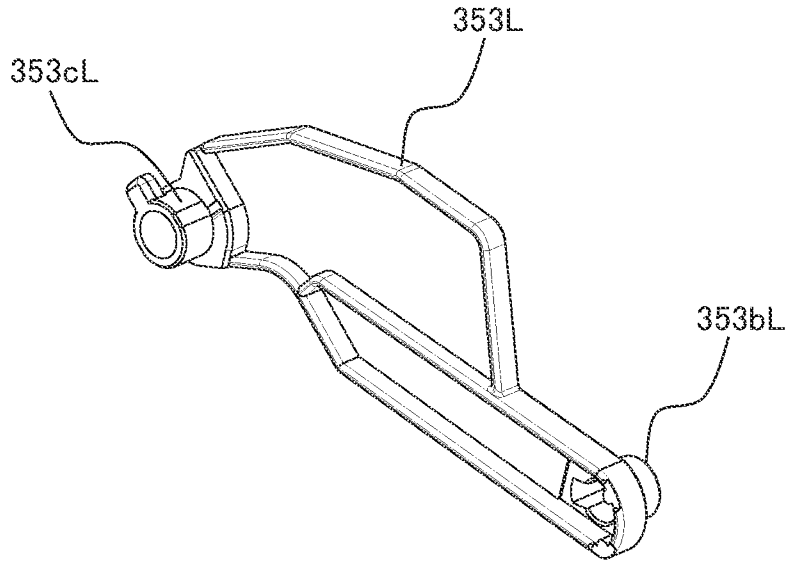
FIG. 4A is a perspective view illustrating a link arm seen from one direction.
Figure 4B:
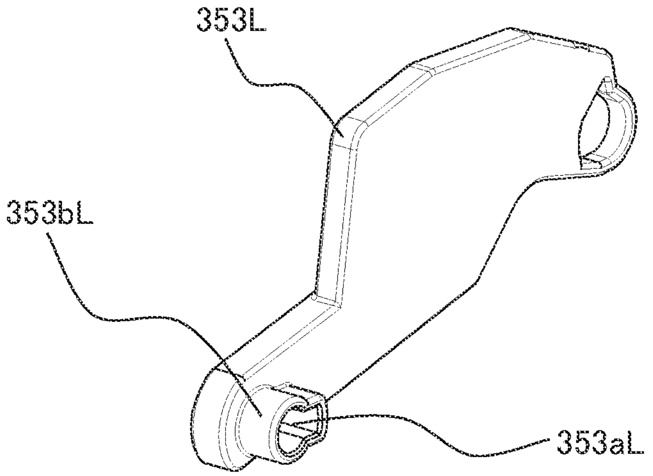
FIG. 4B is a perspective view illustrating the link arm seen from another direction.

As illustrated in FIGS. 4A and 4B, the link arm 353L includes a boss 353*b*L formed at a first end portion and a boss 353*c*L formed at a second end portion. The boss 353*c*L is supported pivotably by the printer body 1A, and the boss 353*b*L engages with the second guide rail 350*b*L of the front cover 350. In the same manner, the link arm 353R includes a boss 353*b*R formed at a first end portion and a boss 353*c*R formed at a second end portion (see FIG. 2). The boss 353*c*R is supported pivotably by the printer body 1A and the boss 353*b*R engages with the second guide rail 350*b*R of the front cover 350.

Figure 5A:
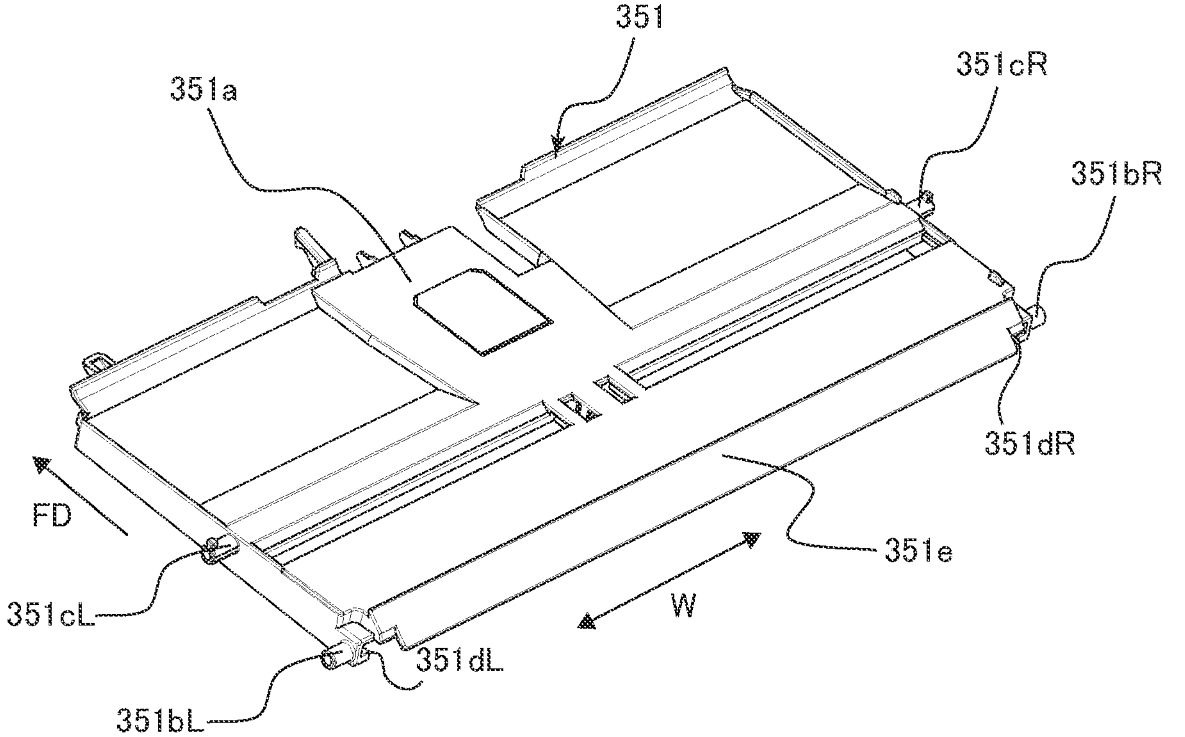
FIG. 5A is a perspective view illustrating a manual feed tray seen from an upper surface side.
Figure 5B:
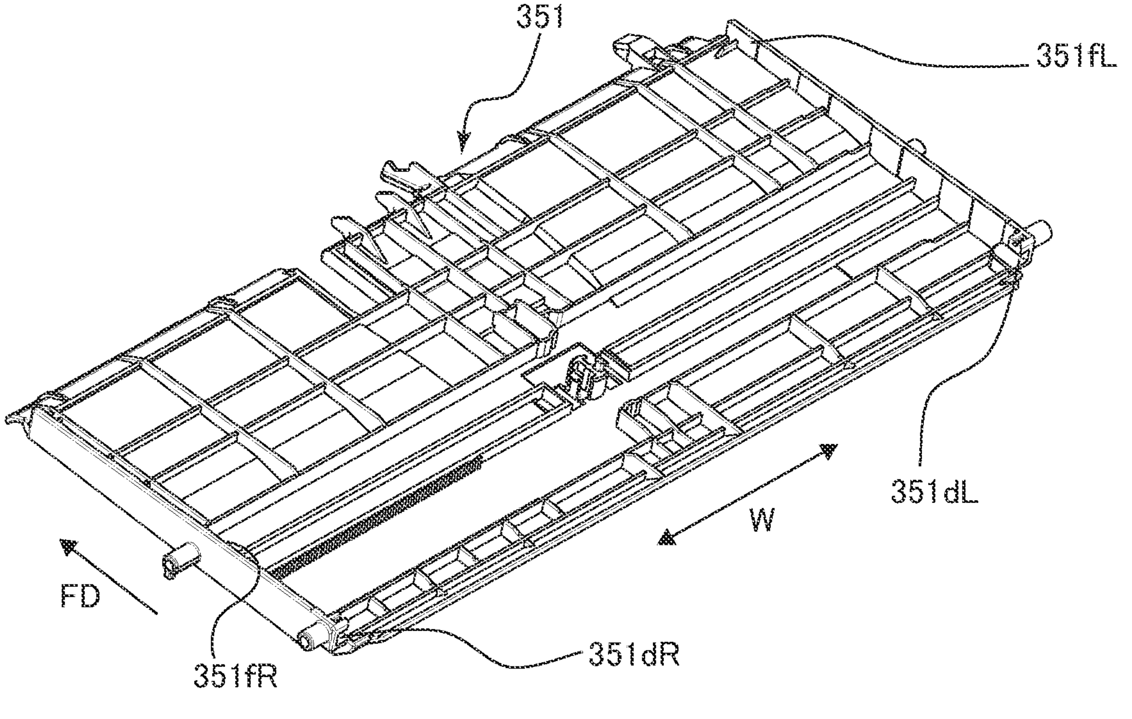
FIG. 5B is a perspective view illustrating the manual feed tray seen from a bottom surface side.

FIG. 5A is a perspective view illustrating the manual feed tray 351 seen from a stacking plane 351*a*, i.e., an upper surface side, and FIG. 5B is a perspective view illustrating the manual feed tray 351 seen from an opposite surface, i.e., a bottom surface side of the stacking plane 351*a*. The manual feed tray 351 serving as a first supporting portion is movable between a closed position, i.e., a second closed position illustrated in FIG. 7 and an open position, i.e., a second open position illustrated in FIG. 8. The manual feed tray 351 is accommodated in the printer body 1A when the manual feed tray 351 is positioned at the closed position and is cable of supporting the sheet when the manual feed tray 351 is positioned at the open position.

As illustrated in FIGS. 5A and 5B, the manual feed tray 351 includes a stacking plane 351*a* formed on the upper surface of the manual feed tray 351 and on which the sheet is stacked and first shafts 351*b*L and 351*b*R and second shafts 351*c*L and 351*c*R projecting from both side surface of the manual feed tray 351. The second shafts 351*c*L and 351*c*R serving as first bosses engage respectively with holes 353*a*L and 353*a*R formed through the bosses 353*b*L and 353*b*R of the link arms 353L and 353R.

First shafts 351*b*L and 351*b*R serving as second bosses of the manual feed tray 351 engage respectively with the first guide rails 350*a*L and 350*a*R formed on the tray supporting portions 350*k*L and 350*k*R of the front cover 350. The first shafts 351*b*L and 351*b*R are held slidably within the first guide rails 350*a*L and 350*a*R.

Holding guides 351*d*L and 351*d*R are provided at an upstream end portion in the sheet feeding direction FD and at both end portions in the width direction W of the manual feed tray 351. Still further, wall portions 351*f*L and 351*f*R are formed at both end portions in the width direction W of the manual feed tray 351. An inclined portion 351*e* is formed at the upstream end portion in the sheet feeding direction FD of the manual feed tray 351.

Figure 6:
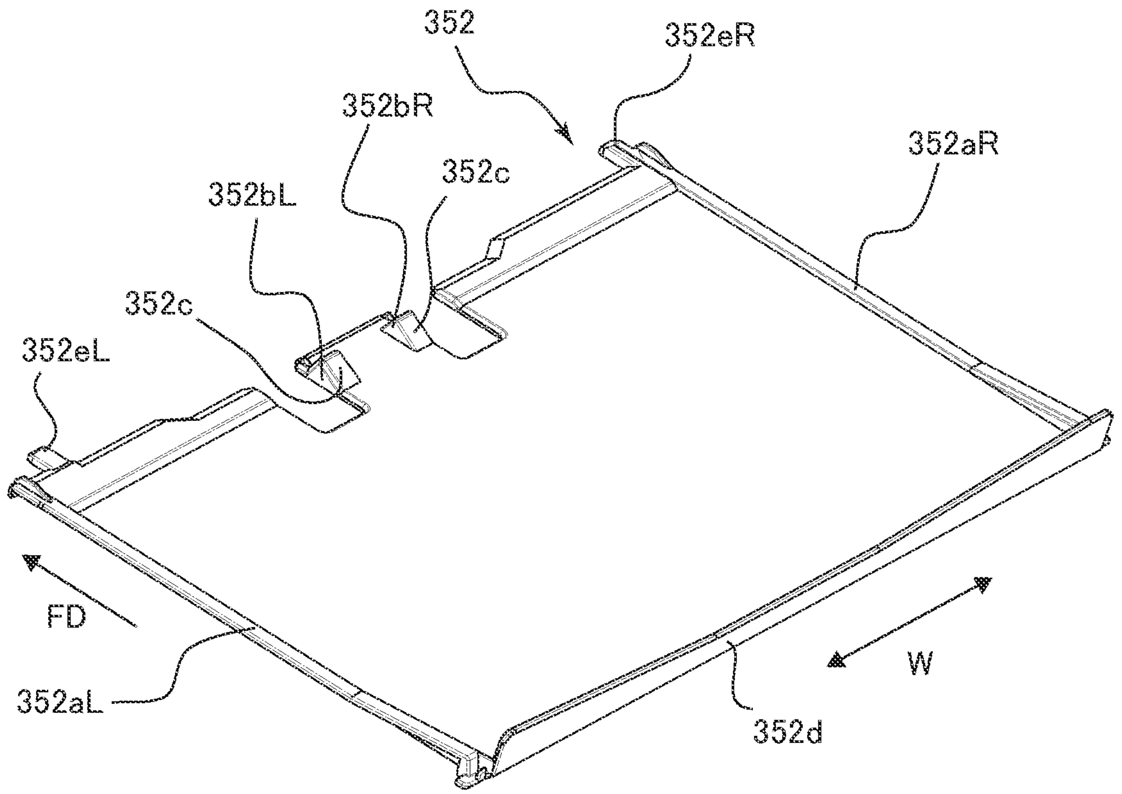
FIG. 6 is a perspective view illustrating an extension tray.

As illustrated in FIG. 6, the extension tray 352 serving as a second supporting portion is provided with a pair of guide ribs 352*a*L and 352*a*R at both widthwise end portions, and a grip portion 352*d*, that can be gripped by the user, is provided at the upstream end portion in the sheet feeding direction FD. The pair of guide ribs 352*a*L and 352*a*R are held slidably by the holding guides 351*d*L and 351*d*R of the manual feed tray 351 (see FIGS. 5A and 5B). The more the grip portion 352*d* extends in the width direction W, the more the grip portion 352*d* projects upward so as to have a function of holding the sheet stacked in the manual feed tray 351 and the extension tray 352 from not slipping out of the extension tray 352.

A pair of abutment portions 352*e*L and 352*e*R and a pair of claw portions 352*b*L and 352*b*R are provided at a downstream end portion in the sheet feeding direction FD of the extension tray 352. The pair of claw portions 352*b*L and 352*b*R is disposed inside in the width direction W of the pair of abutment portions 352*e*L and 352*e*R. The pair of abutment portions 352*e*L and 352*e*R abuts with an under surface of the manual feed tray 351 in a state in which the extension tray 352 is drawn out of the manual feed tray 351. That is, the extension tray 352 is supported by the holding guides 351*d*L and 351*d*R from underside and abuts with the under surface of the manual feed tray 351 so as to keep a posture of being drawn out of the manual feed tray 351.

Opening Operation of Front Cover

Next, an opening operation of the front cover 350 will be described with reference to FIGS. 7 and 8. Note that because one side in the width direction W of the manual sheet feed portion 500 operates in the same manner with another side, only a left side in the width direction W of the manual sheet feed portion 500, i.e., a side denoted by the reference sign 'L', will be described below. FIG. 7 is a section view illustrating a state in which the front cover 350 and the manual feed tray 351 are positioned at the closed position, and FIG. 8 is a section view illustrating a state in which the front cover 350 and the manual feed tray 351 are positioned at the open position.

As illustrated in FIG. 7, the exterior face 350*m* of the front cover 350 is disposed so as to vertically extend to configure a part of the exterior face of the printer 1 when the front cover 350 is positioned at the closed position. At this time, the manual feed tray 351, the extension tray 352, the link arm 353L and the sheet feed unit 354 are accommodated inside of the printer body 1A and take a posture of erecting approximately in the vertical direction. The manual feed tray 351 and the extension tray 352 are nonvisible from the user by being covered by the ribs 350*c*, 350*g* and 350*h* of the front cover 350.

When the front cover 350 is positioned at the closed position, the second shaft 351*c*L of the manual feed tray 351 is positioned at a side closer to an upper end portion of the second guide rail 350*b*L and to the exterior face 350*m*. In the same manner, the first shaft 351*b*L of the manual feed tray 351 is positioned at a side closer to an upper end portion of the first guide rail 350*a*L and to the exterior face 350*m*. A distance between a center C1 of the second shaft 351*c*L and the exterior face 350*m* at this time is defined as a distance D1, and a distance between a center C2 of the first shaft 351*b*L and the exterior face 350*m* is defined as a distance D2. Note that the distance D1 is greater than the distance D2, i.e., D1>D2, in the present exemplary embodiment. The second shaft 351*c*L may be called as a first part of the manual feed tray 351, and the first shaft 351*b*L may be called as a second part of the manual feed tray 351. The second shaft 351*c*L is positioned downstream of the first shaft 351*b*L in terms of the sheet feeding direction FD. The extension tray 352 is drawn out of the manual feed tray 351 in a direction opposite to the sheet feeding direction FD. Therefore, the second shaft 351*c*L is positioned upstream of the first shaft 351*b*L in terms of the direction in which the extension tray 352 is drawn out of the manual feed tray 351.

The front cover 350 can be opened and closed centering on an opening and closing shaft 355, and the user can conduct an opening operation on the front cover 350 from the closed position as illustrated in FIG. 7 to the open position as illustrated in FIG. 8. As the opening operation is conducted on the front cover 350 as illustrated in FIGS. 7 and 8, the boss 353*b*L of the link arm 353L moves within the second guide rail 350*b*L and abuts with the abutment surface 350*n*L of the second guide rail 350*b*L. Thereby, the front cover 350 is held at the open position. Still further, because the second shaft 351*c*L of the manual feed tray 351 is engaged with a hole 353*a*L formed through the boss 353*b*L (see FIG. 4B), the second shaft 351*c*L moves together with the boss 353*b*L and is positioned in a vicinity of the abutment surface 350*n*L.

Similarly to that, as the front cover 350 is opened, the first shaft 351*b*L of the manual feed tray 351 moves within the first guide rail 350*a*L and abuts with an abutment surface 350*p*L of the first guide rail 350*a*L. These abutment surfaces 350*n*L and 350*p*L are positioned at downstream end portions in the sheet feeding direction FD of the second guide rail 350*b*L and the first guide rail 350*a*L, respectively.

Thus, the manual feed tray 351 moves from the closed position to the open position in linkage with the move of the front cover 350 from the closed position to the open position. At this time, the manual feed tray 351 moves relatively to the front cover 350. More specifically, along with the opening operation of the front cover 350, the first shaft 351*b*L and the second shaft 351*c*L of the manual feed tray 351 move within the first guide rail 350*a*L and the second guide rail 350*b*L such that the manual feed tray 351 moves from the closed position to the open position. That is, the link arm 353L and the first guide rail 350*a*L serving as a hole portion constitute an interlocking portion 600 that moves the manual feed tray 351 from the closed position to the open position when the front cover 350 is opened from the closed position to the open position.

The first guide rail 350*a*L and the second guide rail 350*b*L are formed such that the closer to the downstream side in the sheet feeding direction FD, the narrower their widths become. Therefore, the first shaft 351*b*L and the boss 353*b*L engage with the first guide rail 350*a*L and the second guide rail 350*b*L with almost no rattling in the state in which the front cover 350 is positioned at the open position, so that rattling of the front cover 350 is reduced.

When the front cover 350 is positioned at the open position, a distance between the center C1 of the second shaft 351*c*L and the exterior face 350*m* is defined as a distance D3, and a distance between the center C2 of the first shaft 351*b*L and the exterior face 350*m* is defined as a distance D4. Note that the distance D3 is larger than the distance D4, i.e., $D3>D4$.

Then, the distances D1, D2, D3 and D4 are set such that a relationship of $D3/D1<D4/D2$ holds in the present exemplary embodiment. The distances D1, D2, D3 and D4 are also set such that a relationship of $(D3-D1)<(D4-D2)$ holds in the present exemplary embodiment.

Thereby, as illustrated in FIG. 8, a moving angle $\theta 2$ of the manual feed tray 351 in moving from the closed position to the open position is smaller than a moving angle $\theta 1$ of the front cover 350 in moving from the closed position to the open position, i.e., $\theta 2<\theta 1$. In FIG. 8, a line along the exterior face 350*m* of the front cover 350 positioned at the closed position is represented by a broken line F11, and a line along the exterior face 350*m* of the front cover 350 positioned at the open position is represented by a broken line F12. Aline along an outer side surface of the manual feed tray 351 positioned at the closed position is also represented by a broken line F21, and a line along an outer side surface of the front cover 350 positioned at the open position is represented by a broken line F22. The broken lines F11 and F21 extend approximately in the vertical direction and are in parallel with each other in the present exemplary embodiment. Note that the broken lines F11 and F21 need not be always in parallel with each other. The moving angle $\theta 1$ is an angle formed between the broken lines F11 and F12, and the moving angle $\theta 2$ is an angle formed between the broken lines F21 and F22.

That is, the manual feed tray 351 takes such a posture that the upstream end portion in the sheet feeding direction FD is lifted up with respect to an inner surface of the front cover 350. In other words, the upstream end portion in the sheet feeding direction FD of the manual feed tray 351 is positioned at a position separated from the exterior face 350*m* of the front cover 350 more than the downstream end portion in the sheet feeding direction FD of the manual feed tray 351. The extension tray 352 slidably or drawably supported by the manual feed tray 351 also takes such a posture that an upstream end portion in the sheet feeding direction FD is lifted up with respect to the inner surface of the front cover 350. That is, when the manual feed tray 351 moves from the closed position to the open position, the upstream end portion in the sheet feeding direction FD of the manual feed tray 351 is displaced largely with respect to the front cover 350 more than the downstream end portion in the sheet feeding direction FD.

Draw-Out Operation of Extension Tray

Figure 9:
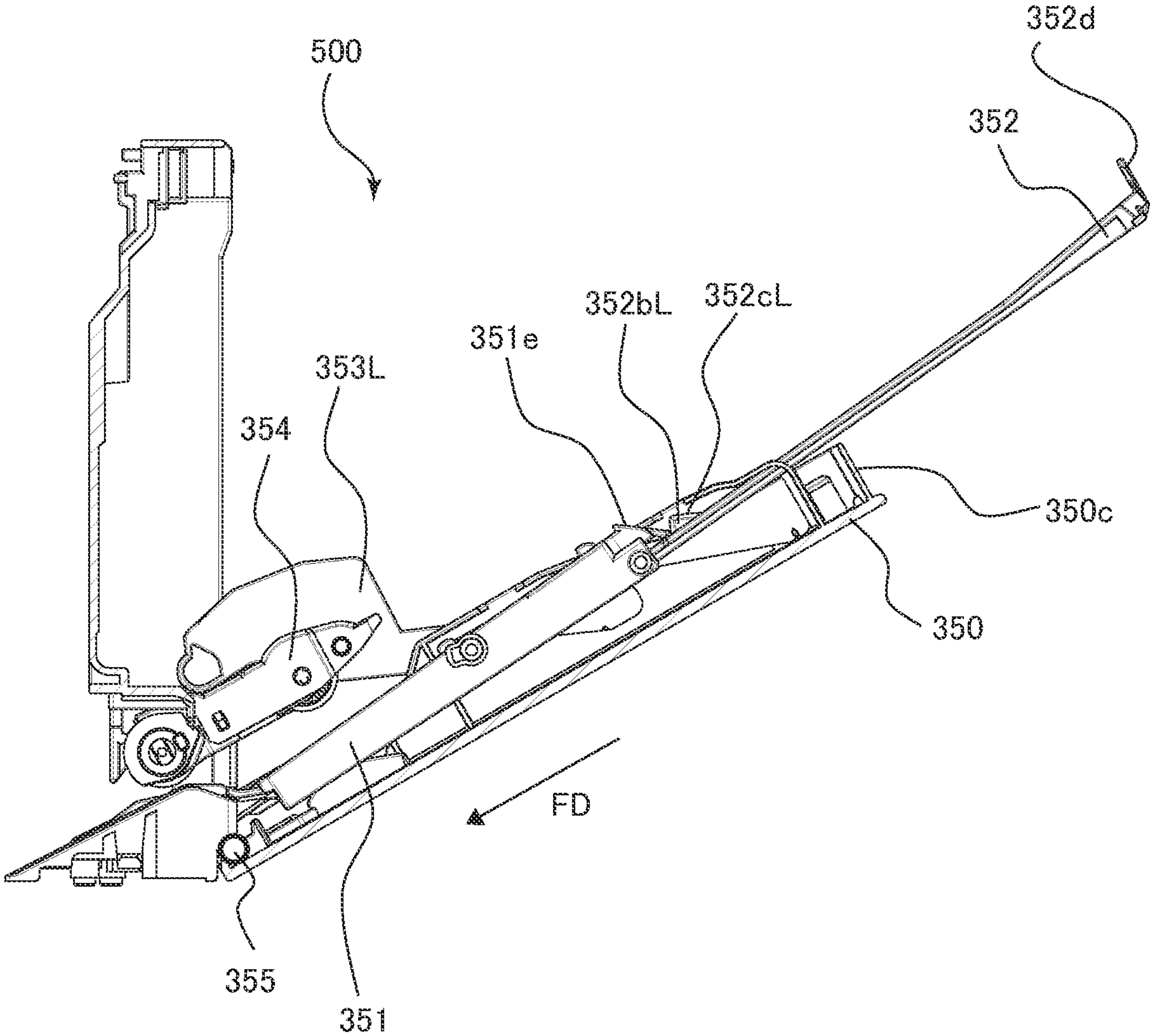
FIG. 9 is a section view illustrating a state in which the extension tray is drawn out of the manual feed tray.

Next, a draw-out operation of the extension tray 352 will be described with reference to FIGS. 9 and 10. The user can draw out the extension tray 352 toward upstream in the sheet feeding direction FD by grasping the grip portion 352*d* of the extension tray 352 in a state in which the front cover 350 is positioned at the open position. At this time, the guide rib 352*a*L of the extension tray 352 is supported slidably by the holding guide 351*d*L of the manual feed tray 351.

Then, as the claw portion 352*b* of the extension tray 352 engages with an end portion of an inclined portion 351*e* of the manual feed tray 351, the extension tray 352 is held in a state of being drawn out of the manual feed tray 351. The claw portion 352*b*L is also provided with an inclined plane 352*c*. The inclined plane 352*c* protrudes in a sheet thickness direction, i.e., in a direction separating from the extension tray 352, to close a part of a gap formed between the manual feed tray 351 and the extension tray 352. The inclined plane 352*c* also enables to smoothly deliver a sheet to the inclined portion 351*e* of the manual feed tray 351.

The user often sets a sheet on the manual feed tray 351 while sliding a leading edge of the sheet along the upper surface of the extension tray 352 in the state in which the extension tray 352 is drawn out of the manual feed tray 351. If there is a level difference between the extension tray 352 and the manual feed tray 351 at this time, there is a possibility that the leading edge of the sheet is caught by the level difference and sheet settability is hampered. However, because the sheet is smoothly guided from the inclined plane 352*c* of the claw portion 352*b*L to the inclined portion 351*e* of the manual feed tray 351 in the present exemplary embodiment, the sheet settability can be improved.

By the way, the front cover 350 is required to have a certain degree of stiffness such that the front cover 350 is not bent when the user operates to open or close the front cover 350. To that end, the front cover 350 includes the rib 350*c* at the upstream end portion in the sheet feeding direction FD thereof as described above. Still further, downsizing of the printer 1 and the manual sheet feed portion 500 is demanded lately. That is, it is desired to assure stiffness of the front cover 350 while realizing downsizing of the manual sheet feed portion 500 in a state in which the front cover 350 is closed.

For instance, in a case where the rib 350*c* is provided at the upstream end portion in the sheet feeding direction FD of the front cover 350 as described in the present exemplary embodiment, it is necessary to draw out the extension tray 352 while avoiding the rib 350*c*. In a case where the draw-out direction of the extension tray 352 is approximately in parallel with the exterior face 350*m* of the front cover 350, the extension tray 352 has to be disposed at a height that exceeds the rib 350*c*, thus enlarging the manual sheet feed portion 500.

Then, according to the present exemplary embodiment, the manual feed tray 351 is accommodated in a posture of running along the front cover 350 in the state in which the front cover 350 is positioned at the closed position to downsize the manual sheet feed portion 500 as illustrated in FIG. 7. When the extension tray 352 is seen along the draw-out direction of the extension tray 352 in this state, the extension tray 352 overlaps with the rib 350*c*. Meanwhile, in the state in which the front cover 350 is positioned at the open position as illustrated in FIG. 8, the manual feed tray 351 takes a posture in which the upstream end portion in the sheet feeding direction FD is lifted up with respect to the front cover 350. In this state, the extension tray 352 does not overlap with the rib 350*c* when the extension tray 352 is seen along the draw-out direction. The manual feed tray 351 takes the position in which the upstream end portion in the sheet feeding direction FD is lifted up from the front cover 350. Then, the holding guide 351*d*L of the manual feed tray 351 guides the draw-out operation of the extension tray 352 such that the extension tray 352 does not abut with the rib 350*c*. Therefore, the extension tray 352 can be drawn out of the manual feed tray 351 such that the extension tray 352 passes above the rib 350*c* without interfering with the rib 350*c*.

The manual feed tray 351 automatically takes a position as illustrated in FIG. 8 by opening the front cover 350, and the extension tray 352, slidably supported by the manual feed tray 351, follows the manual feed tray 351. Then, because the user performs a drawing-out operation of the extension tray 352, mechanical reliability is high and it is possible to achieve both improvements of stiffness of the front cover 350 and of drawability of the extension tray 352. Still further, because the manual feed tray 351 does not take such a posture that the upstream end portion in the sheet feeding direction FD is lifted up with respect to the front cover 350 in the state in which the front cover 350 is positioned at the closed position, the apparatus can be downsized.

The position of the extension tray 352 is restricted widthwise by the wall portions 351*f*L and 351*f*R of the manual feed tray 351 and vertically by the restriction ribs 350*d*L and 350*d*R. Therefore, it is possible to reduce rattling during the drawing operation of the extension tray 352 and to improve drawing operability of the extension tray 352.

It is also conceivable that the user operates and closes the front cover 350 in a state in which the extension tray 352 is drawn out by forgetting to accommodate the extension tray 352 into the manual feed tray 351. When the front cover 350 is closed from the open position to the closed position, the upstream end portions in the sheet feeding direction FD of the manual feed tray 351 and the extension tray 352 approach to the inner surface of the front cover 350. However, because the extension tray 352 interferes with the rib 350*c* of the front cover 350 in the state in which the extension tray 352 is drawn out, there is a possibility that the manual feed tray 351 and the extension tray 352 are damaged if the user tries to forcibly close the front cover 350.

Figure 10:
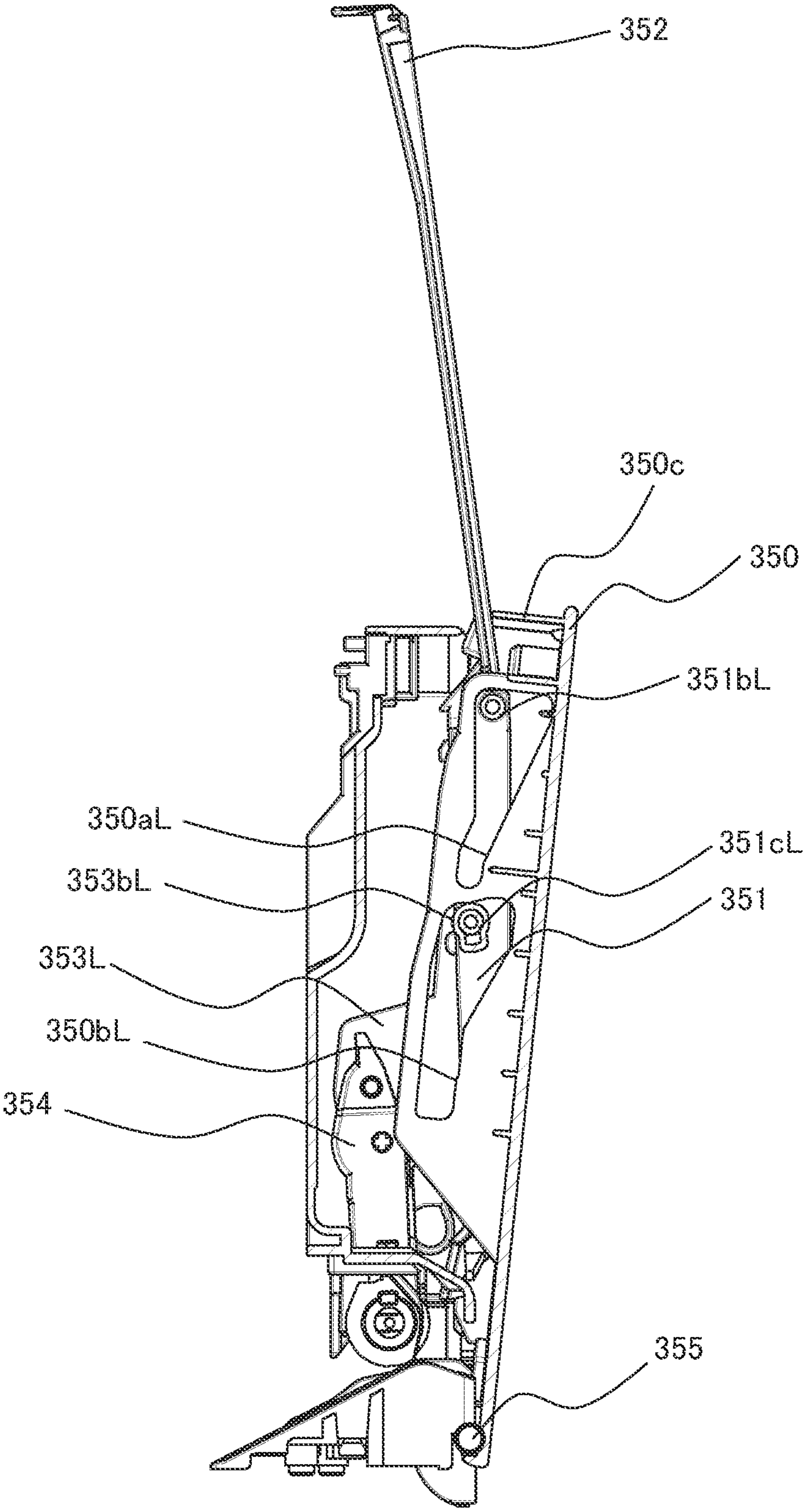
FIG. 10 is a section view illustrating a state in which the front cover is closed while the extension tray is drawn out.

Then, according to the present exemplary embodiment, the first guide rail 350*a*L of the front cover 350 is formed such that the closer to an outside in a radial direction orthogonal to the pivot direction of the front cover 350, the wider the width of the first guide rail 350*a*L is as illustrated in FIG. 10. Therefore, the first shaft 351*b*L is movable by deviating from a moving locus of the first shaft 351*b*L in opening or closing the front cover 350 in the state in which the extension tray 352 is accommodated in the manual feed tray 351 as illustrated in FIGS. 7 and 8.

If the user tries to close the front cover 350 from the open position to the closed position in the state in which the extension tray 352 is drawn out, the first shaft 351*b*L of the manual feed tray 351 moves from the position as illustrated in FIG. 8 in a direction of gradually approaching to the front side of the front cover 350 and to the exterior face 350*m* of the front cover 350. However, the extension tray 352 being drawn out interferes with the rib 350*c* of the front cover 350 on a way of the closing operation of the front cover 350.

If the user tries to close the front cover 350 further to the closed position at this time, the first shaft 351*b*L moves to an upper left corner of the first guide rail 350*a*L as illustrated in FIG. 10. That is, the first shaft 351*b*L moves within the first guide rail 350*a*L so as to release a force received by the extension tray 352 from the printer body 1A. Due to that, it is possible to mitigate impact received by the manual feed tray 351 and the extension tray 352 from the printer body 1A and to suppress the manual feed tray 351 and the extension tray 352 from being damaged.

As described above, according to the present exemplary embodiment, the front cover 350 is provided with the ribs 350*c*, 350*g* and 350*h* to improve stiffness of the front cover 350. The rib 350*c* is positioned at the position farther from the opening and closing shaft 355 serving as an opening and closing center of the front cover 350 than the extension tray 352 being attached to the manual feed tray 351 as illustrated in FIG. 7. Space saving of the manual sheet feed portion 500 is realized when the front cover 350 is positioned at the closed position and the sheet feeding apparatus can be downsized by the manual feed tray 351, the extension tray 352 and the rib 350*c* constructed as described above.

Still further, the moving angle θ2 of the manual feed tray 351 in moving from the closed position to the open position is smaller than the moving angle θ1 of the front cover 350 in moving from the closed position to the open position as illustrated in FIG. 8. The upstream end in the sheet feeding direction FD of the manual feed tray 351 is lifted up from the front cover 350 by opening the front cover 350 to the open position by thus setting the opening angles of the manual feed tray 351 and the front cover 350.

This arrangement makes it possible to smoothly draw out the extension tray 352 out of the manual feed tray 351 without interfering with the rib 350*c* of the front cover 350 and to improve drawing operability of the extension tray 352. Thus, it is possible to improve the drawing operability of the extension tray 352 while increasing the stiffness of the front cover 350 and downsizing the sheet feeding apparatus.

Other Embodiments

It is noted that while the front cover 350 is provided with the ribs 350*c*, 350*g* and 350*h* in the exemplary embodiment described above, the present disclosure is not limited to such configuration. For instance, it is not necessary to provide all of the ribs 350*c*, 350*g* and 350*h* on the front cover 350, and either one or two of the ribs 350*c*, 350*g* and 350*h* may be provided on the front cover 350. Still further, shapes, sizes and dispositions of the ribs provided on the front cover 350 are not limited.

The manual feed tray 351 includes the second shafts 351*c*L and 351*c*R supported by the link arms 353L and 353R and the first shafts 351*b*L and 351*b*R supported by the first guide rails 350*a*L and 350*a*R of the front cover 350 in the exemplary embodiment described above. Then, while the manual feed tray 351 is opened or closed by moving the second shafts 351*c*L and 351*c*R and the first shafts 351*b*L and 351*b*R in opening or closing the front cover 350, the present disclosure is not limited to such configuration. That is, the configuration of the interlocking mechanism of the front cover 350 and the manual feed tray 351 is not limited such configuration.

Still further, while the electro-photographic printer 1 has been used to describe the exemplary embodiment described above, the present disclosure is not limited to such a printer. For instance, the present disclosure is also applicable to an inkjet type image forming apparatus configured to form an image on a sheet by discharging ink droplets from a nozzle. The present disclosure may be applied also to a sheet feeding apparatus of an optional sheet feeding deck connected to an image forming apparatus.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2020-205494, filed Dec. 11, 2020, which is hereby incorporated by reference herein in its entirety.

What is claimed is:

1. A sheet feeding apparatus comprising:
- an apparatus body;
- a cover openably and closably supported between a first closed position and a first open position with respect to the apparatus body, the cover including a first surface;
- a first tray movable between a second closed position where the first tray is accommodated in the apparatus body and a second open position where the first tray is capable of supporting a sheet, the first tray including a second surface;
- an interlocking portion configured to move the first tray from the second closed position to the second open position in a case where the cover is opened from the first closed position to the first open position;
- a second tray drawably supported by the first tray and capable of supporting the sheet together with the first tray; and
- a feed portion configured to feed the sheet supported by the first and second trays in a sheet feeding direction,
- wherein when the cover moves from the first closed position to the first open position, the second tray moves relative to the cover so that the second tray is lifted up from the cover,
- wherein when the cover moves from the first closed position to the first open position, the cover moves so that a first straight line along the first surface moves from a first position to a second position, and when the first tray moves from the second closed position to the second open position, the first tray moves so that a second straight line along the second surface moves from a third position to a fourth position, and
- wherein a narrow angle between the second straight line at the third position and the second straight line at the fourth position is smaller than a narrow angle between the first straight line at the first position and the first straight line at the second position, and
- wherein the first tray includes a guide configured to guide the second tray while the second tray is being drawn out of the first tray.

2. The sheet feeding apparatus according to claim 1, wherein the second tray is capable of being drawn out of the first tray without interfering with the cover in a case where the cover is positioned at the first open position and the first tray is positioned at the second open position.

3. The sheet feeding apparatus according to claim 2, wherein the cover comprises a rib positioned at a position farther from an opening and closing center of the cover than the second tray being attached to the first tray, and
- wherein the second tray is capable of being drawn out of the first tray so as to pass above the rib without interfering with the rib in a case where the cover is positioned at the first open position and the first tray is positioned at the second open position.

4. The sheet feeding apparatus according to claim 1, wherein the interlocking portion comprises a pivot member pivotably supported by the apparatus body and a hole portion provided through the cover,
- wherein the first tray comprises a first boss supported by the pivot member and a second boss supported by the hole portion, and
- wherein a relationship of D3/D1<D4/D2 holds in a case where a distance between a center of the first boss and an exterior face of the cover and a distance between a center of the second boss and the exterior face are defined respectively as D1 and D2 when the cover is positioned at the first closed position and the first tray is positioned at the second closed position, and in a case where a distance between the center of the first boss and the exterior face and a distance between the center of the second boss and the exterior face are defined respectively as D3 and D4 when the cover is positioned at the first open position and the first tray is positioned at the second open position.

5. The sheet feeding apparatus according to claim 4, wherein the second boss is movable within the hole portion so as to release a force received by the second tray from the apparatus body in a case where the cover is closed from the first open position to the first closed position while drawing the second tray out of the first tray.

6. The sheet feeding apparatus according to claim 3, wherein the rib extends in a direction of separating from an exterior face of the cover.

7. The sheet feeding apparatus according to claim 3, wherein the rib extends in a width direction orthogonal to the sheet feeding direction.

8. An image forming apparatus comprising:
- the sheet feeding apparatus according to claim 1; and
- an image forming unit configured to form an image on a sheet fed from the sheet feeding apparatus.

9. The sheet feeding apparatus according to claim 1, wherein the first tray includes an upstream end portion and a downstream end portion with respect to the sheet feeding direction, and
- wherein in a state where the cover is in the first open position and the first tray is in the second open position, the upstream end portion of the first tray is further from an exterior surface of the cover than the downstream end portion of the first tray.

10. The sheet feeding apparatus according to claim 1, wherein the interlocking portion comprises a first pivot member pivotably supported by the apparatus body,
- wherein the first pivot member includes a first engaging portion,
- wherein the cover is provided with a first hole and a second hole,
- wherein the first tray includes a first boss and a second boss,
- wherein at least one of the first engaging portion and the first boss is inserted into the first hole, and
- wherein the second boss is inserted into the second hole.

11. The sheet feeding apparatus according to claim 10, wherein the cover is pivotable about an axis so that the cover moves between the first closed position and the first open position, and wherein the first hole is closer to the axis than the second hole.

12. The sheet feeding apparatus according to claim 10, wherein the interlocking portion comprises a second pivot member pivotably supported by the apparatus body, wherein the second pivot member includes a second engaging portion, wherein the cover is provided with a third hole and a fourth hole, wherein the first tray includes a third boss and a fourth boss, wherein at least one of the second engaging portion and the third boss is inserted into the third hole, and wherein the fourth boss is inserted into the fourth hole.

13. The sheet feeding apparatus according to claim 12, wherein the cover is pivotable about an axis so that the cover moves between the first closed position and the first open position, wherein the first hole is closer to the axis than the second hole, and wherein the third hole is closer to the axis than the fourth hole.

14. The sheet feeding apparatus according to claim 1, wherein the second tray is configured to contact the first tray so as to keep a posture of the second tray drawn out from the first tray.

15. A sheet feeding apparatus comprising:

an apparatus body;

a cover openably and closably supported between a first closed position and a first open position with respect to the apparatus body, the cover including a first surface;

a first tray movable between a second closed position where the first tray is accommodated in the apparatus body and a second open position where the first tray is capable of supporting a sheet, the first tray including a second surface;

an interlocking portion configured to move the first tray from the second closed position to the second open position in a case where the cover is opened from the first closed position to the first open position;

a second tray drawably supported by the first tray and capable of supporting the sheet together with the first tray; and a feed portion configured to feed the sheet supported by the first and second trays in a sheet feeding direction, wherein when the cover moves from the first closed position to the first open position, the second tray moves relative to the cover so that the second tray is lifted up from the cover, wherein when the cover moves from the first closed position to the first open position, the cover moves so that a first straight line along the first surface moves from a first position to a second position, and when the first tray moves from the second closed position to the second open position, the first tray moves so that a second straight line along the second surface moves from a third position to a fourth position, wherein a narrow angle between the second straight line at the third position and the second straight line at the fourth position is smaller than a narrow angle between the first straight line at the first position and the first straight line at the second position, and wherein the second tray is capable of being drawn out of the first tray without interfering with the cover in a case where the cover is positioned at the first open position and the first tray is positioned at the second open position.

16. The sheet feeding apparatus according to claim 15, wherein the cover comprises a rib positioned at a position farther from an opening and closing center of the cover than the second tray being attached to the first tray, and wherein the second tray is capable of being drawn out of the first tray so as to pass above the rib without interfering with the rib in a case where the cover is positioned at the first open position and the first tray is positioned at the second open position.

17. A sheet feeding apparatus comprising:

an apparatus body;

a cover openably and closably supported between a first closed position and a first open position with respect to the apparatus body, the cover including a first surface;

a first tray movable between a second closed position where the first tray is accommodated in the apparatus body and a second open position where the first tray is capable of supporting a sheet, the first tray including a second surface;

an interlocking portion configured to move the first tray from the second closed position to the second open position in a case where the cover is opened from the first closed position to the first open position;

a second tray drawably supported by the first tray and capable of supporting the sheet together with the first tray; and a feed portion configured to feed the sheet supported by the first and second trays in a sheet feeding direction, wherein when the cover moves from the first closed position to the first open position, the second tray moves relative to the cover so that the second tray is lifted up from the cover, wherein when the cover moves from the first closed position to the first open position, the cover moves so that a first straight line along the first surface moves from a first position to a second position, and when the first tray moves from the second closed position to the second open position, the first tray moves so that a second straight line along the second surface moves from a third position to a fourth position, wherein a narrow angle between the second straight line at the third position and the second straight line at the fourth position is smaller than a narrow angle between the first straight line at the first position and the first straight line at the second position, wherein the interlocking portion comprises a first pivot member pivotably supported by the apparatus body, wherein the first pivot member includes a first engaging portion, wherein the cover is provided with a first hole and a second hole, wherein the first tray includes a first boss and a second boss, wherein at least one of the first engaging portion and the first boss is inserted into the first hole, and wherein the second boss is inserted into the second hole.

18. The sheet feeding apparatus according to claim 17, wherein the cover is pivotable about an axis so that the cover moves between the first closed position and the first open position, and wherein the first hole is closer to the axis than the second hole.

19. The sheet feeding apparatus according to claim 17, wherein the interlocking portion comprises a second pivot member pivotably supported by the apparatus body, wherein the second pivot member includes a second engaging portion, wherein the cover is provided with a third hole and a fourth hole, wherein the first tray includes a third boss and a fourth boss, wherein at least one of the second engaging portion and the third boss is inserted into the third hole, and wherein the fourth boss is inserted into the fourth hole.

20. The sheet feeding apparatus according to claim 19, wherein the cover is pivotable about an axis so that the cover moves between the first closed position and the first open position, wherein the first hole is closer to the axis than the second hole, and wherein the third hole is closer to the axis than the fourth hole.

* * * * *